Sept. 1, 1953 J. J. McGINLEY 2,650,459
WRAPPING MACHINE

Filed May 17, 1947 13 Sheets-Sheet 1

INVENTOR
JAMES J. McGINLEY
BY
ATTORNEY

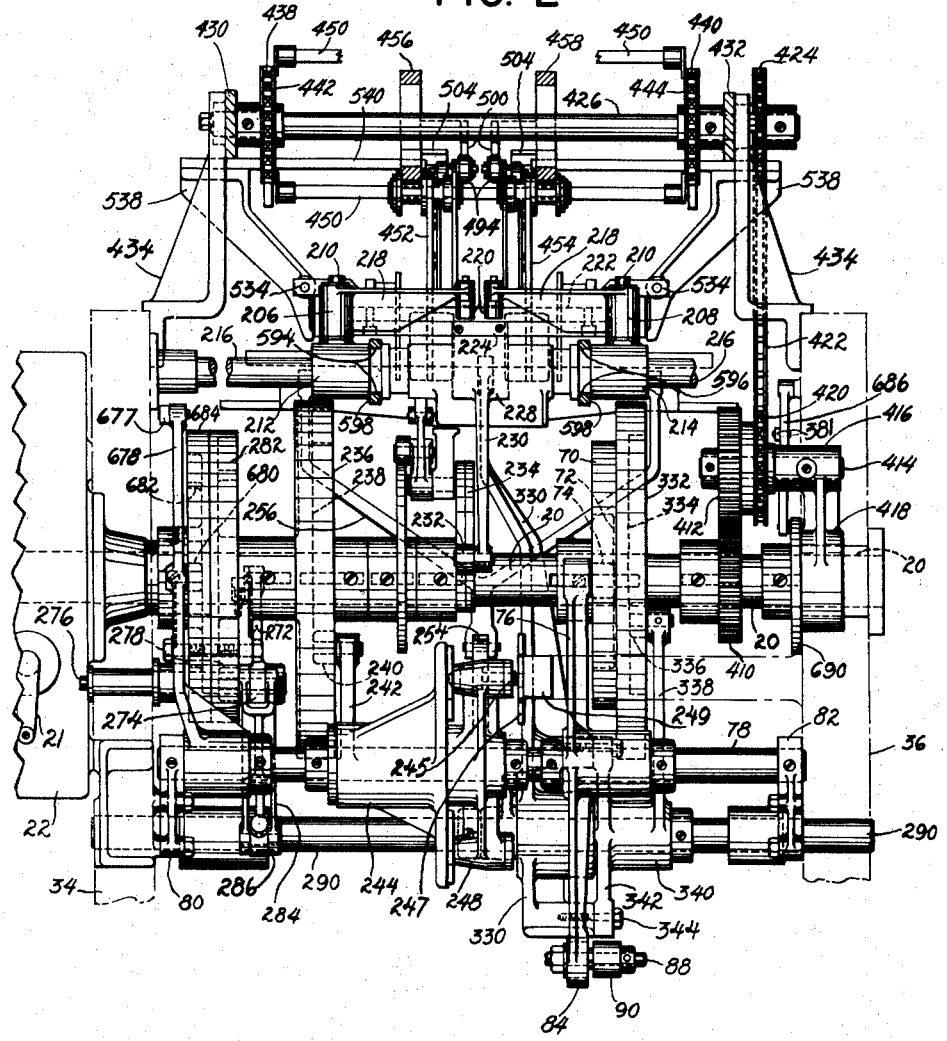

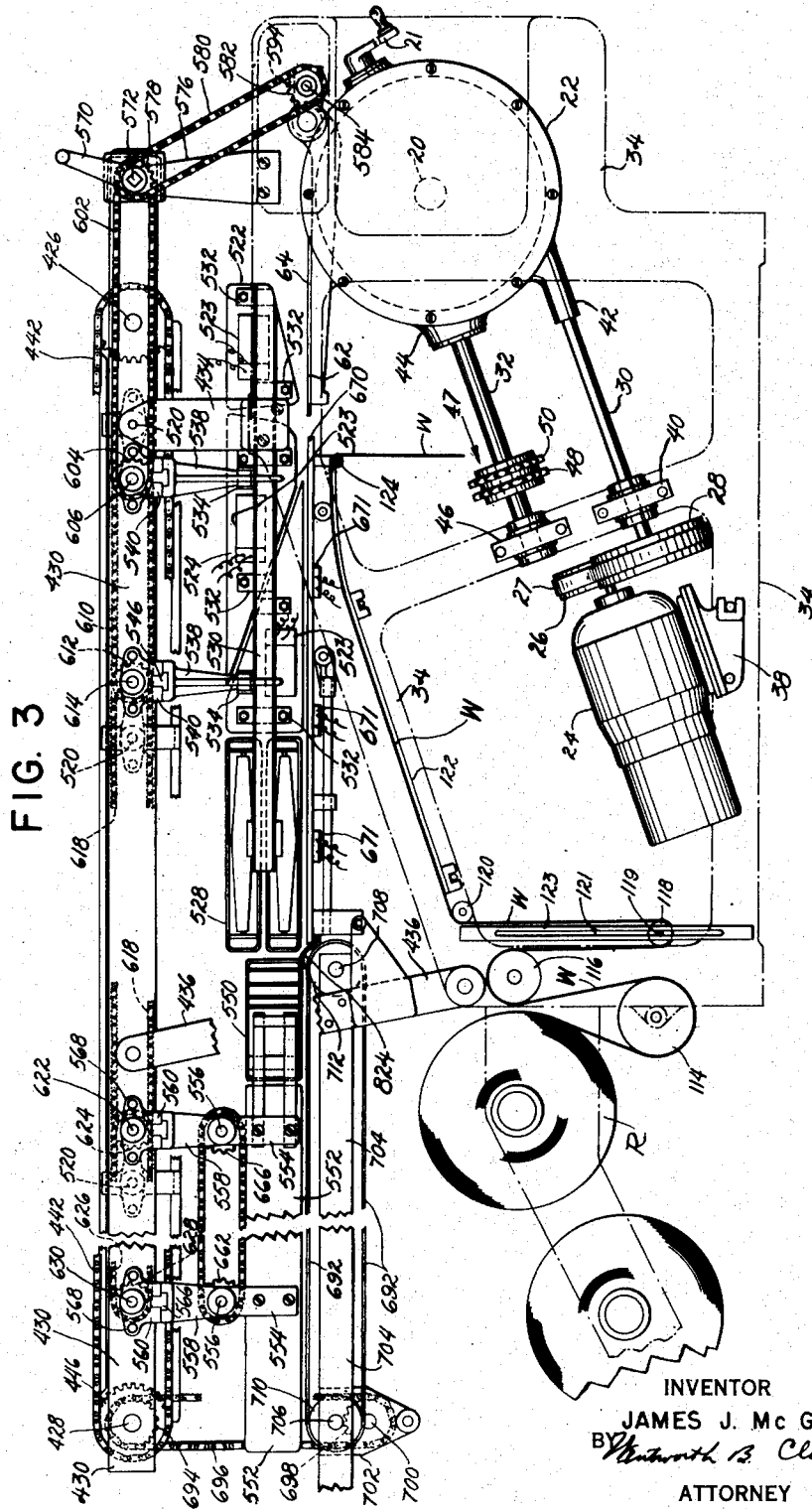

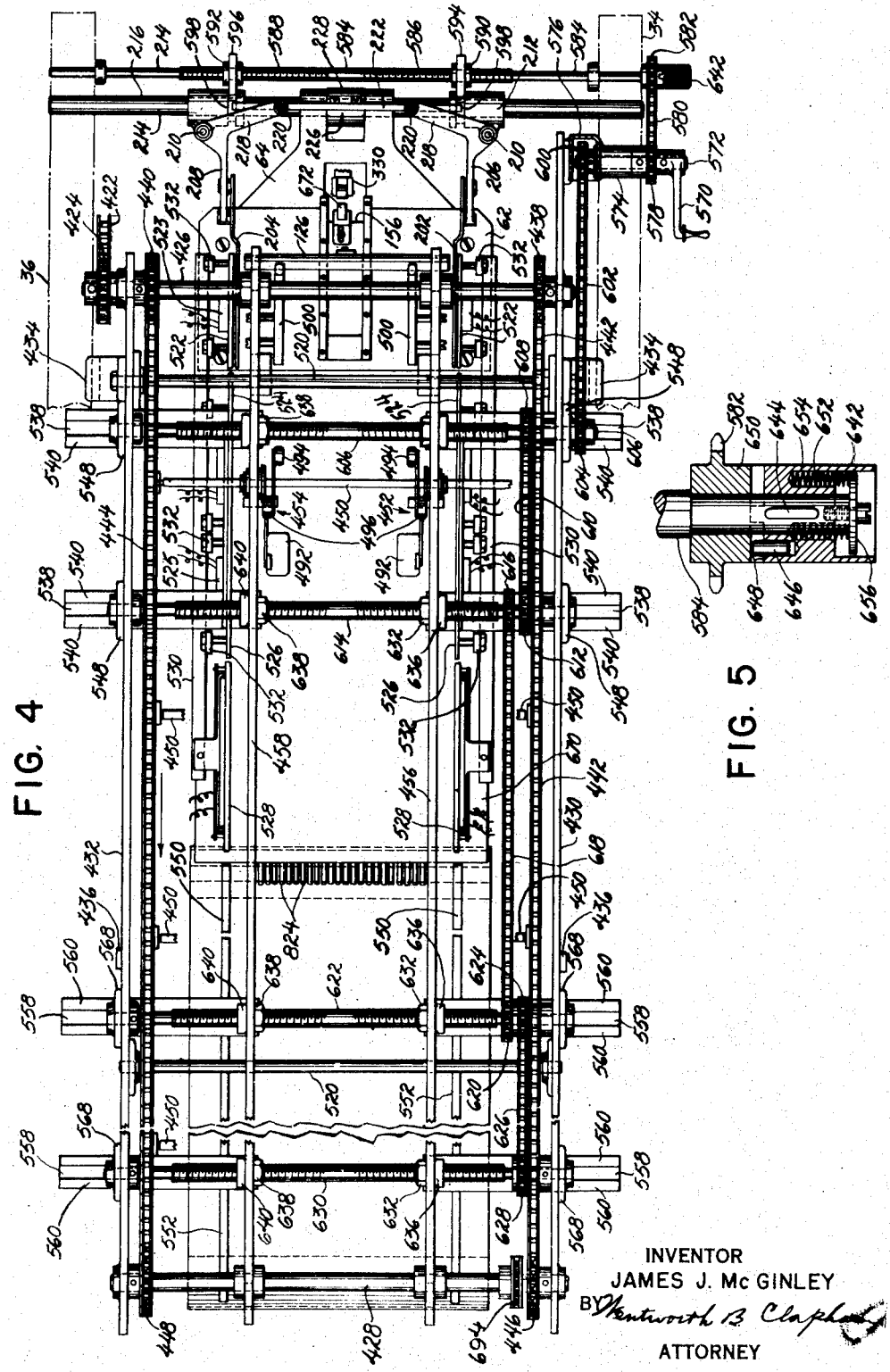

Sept. 1, 1953     J. J. McGINLEY     2,650,459
WRAPPING MACHINE

Filed May 17, 1947     13 Sheets-Sheet 5

INVENTOR
JAMES J. McGINLEY
ATTORNEY

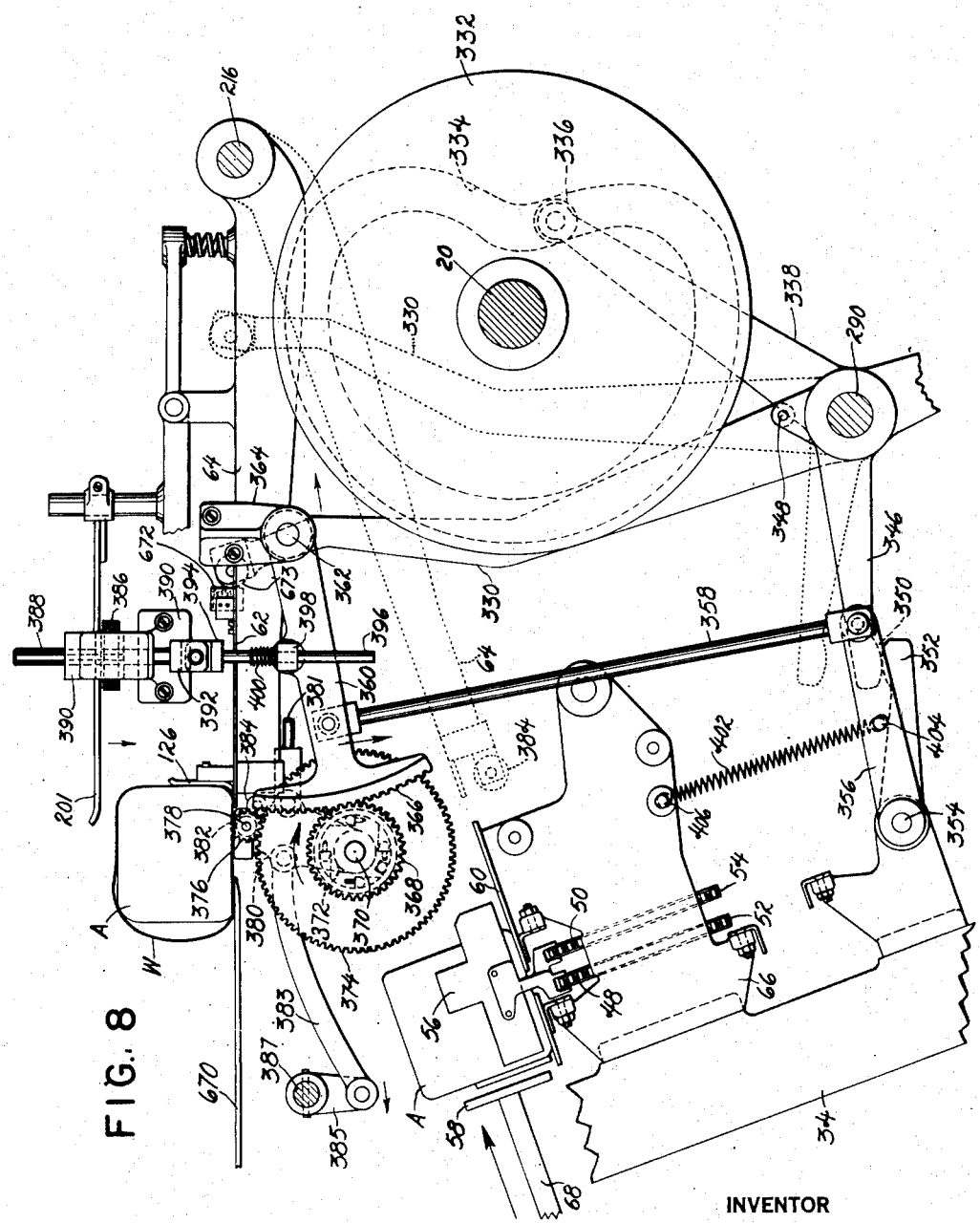

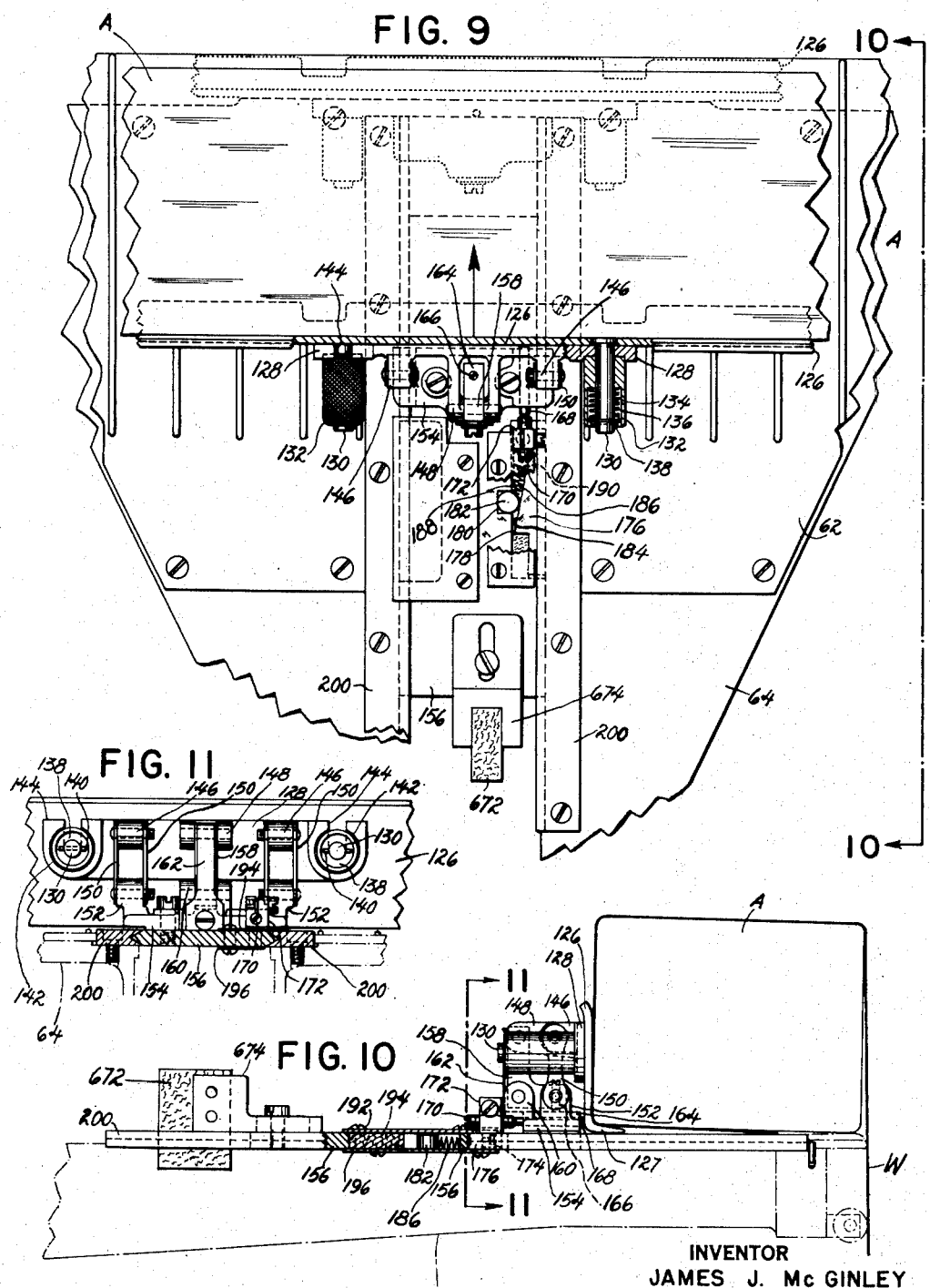

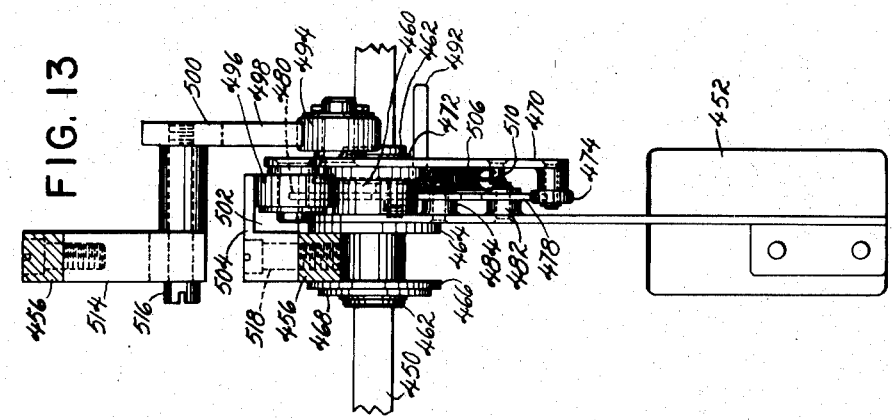
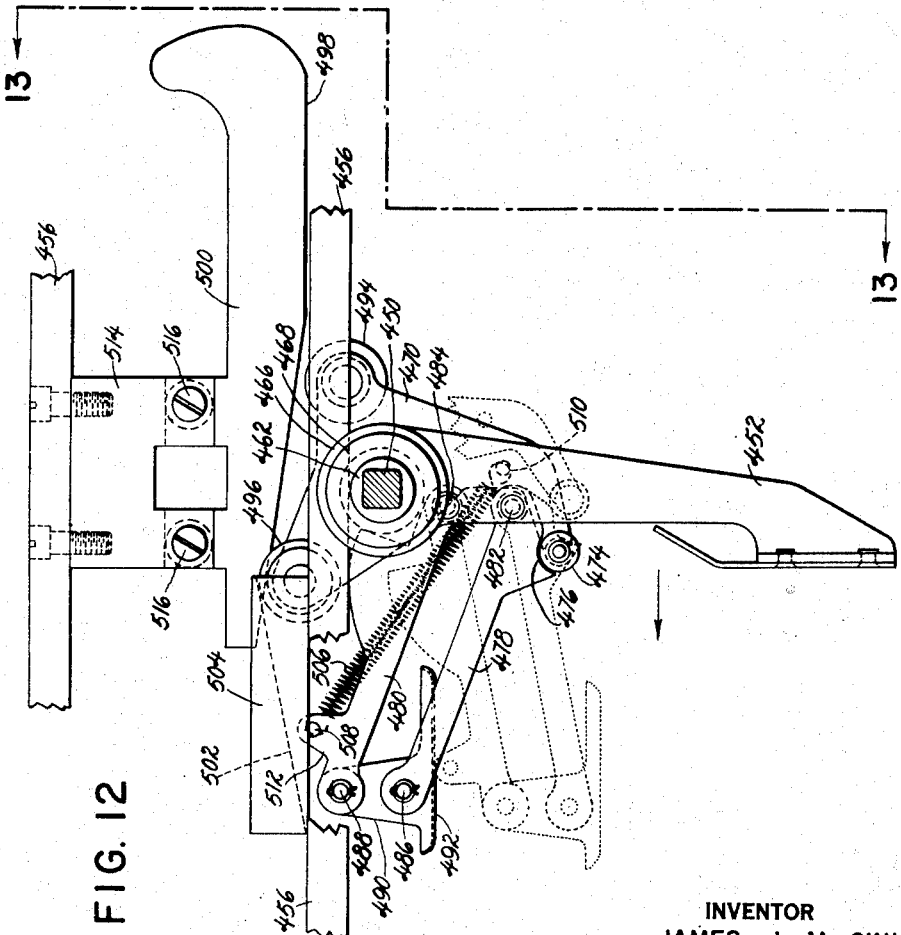

Sept. 1, 1953   J. J. McGINLEY   2,650,459
WRAPPING MACHINE
Filed May 17, 1947   13 Sheets-Sheet 10
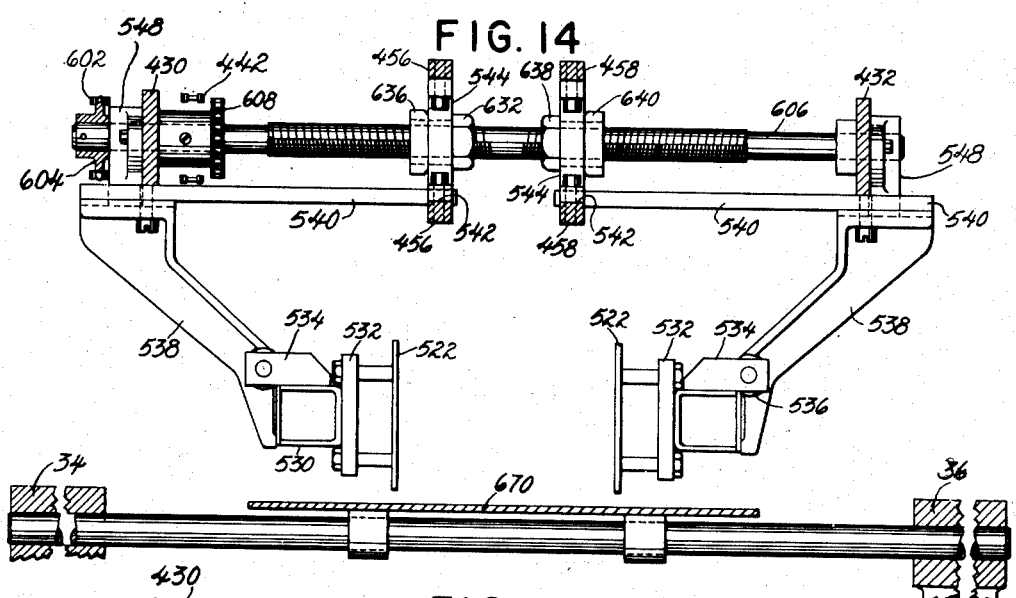
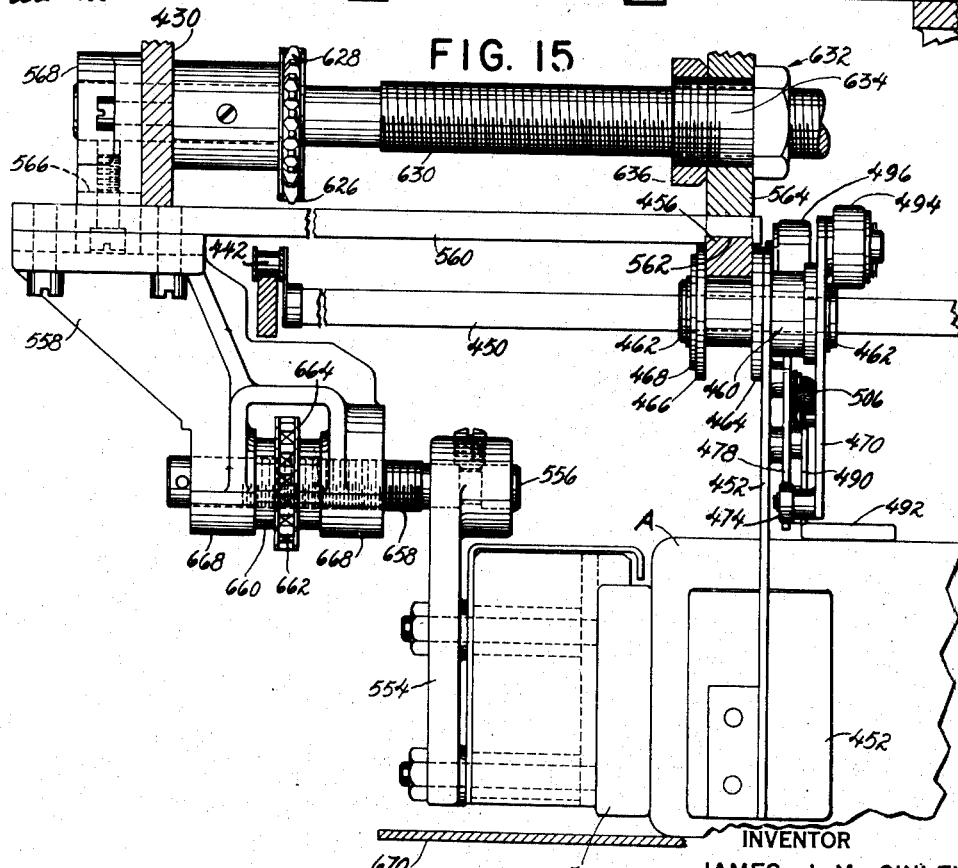
INVENTOR
JAMES J. McGINLEY
BY Wentworth B. Clapham
ATTORNEY Sept. 1, 1953　　　　J. J. McGINLEY　　　　2,650,459
WRAPPING MACHINE
Filed May 17, 1947　　　　　　　　　13 Sheets-Sheet 11
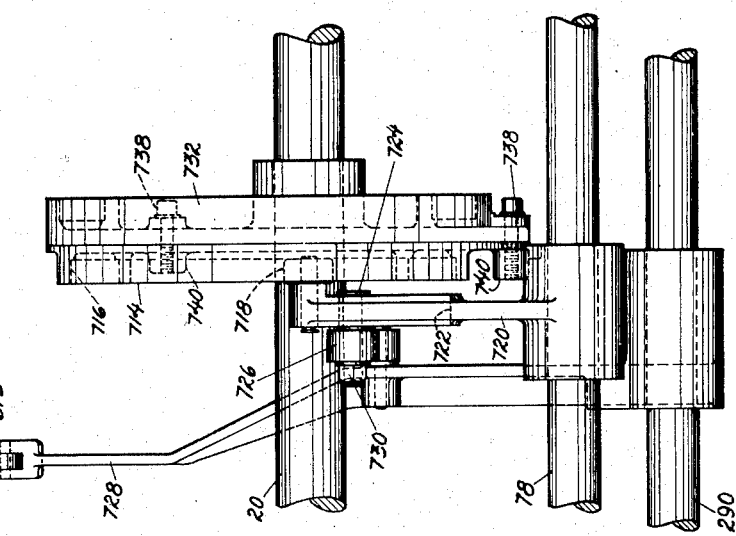
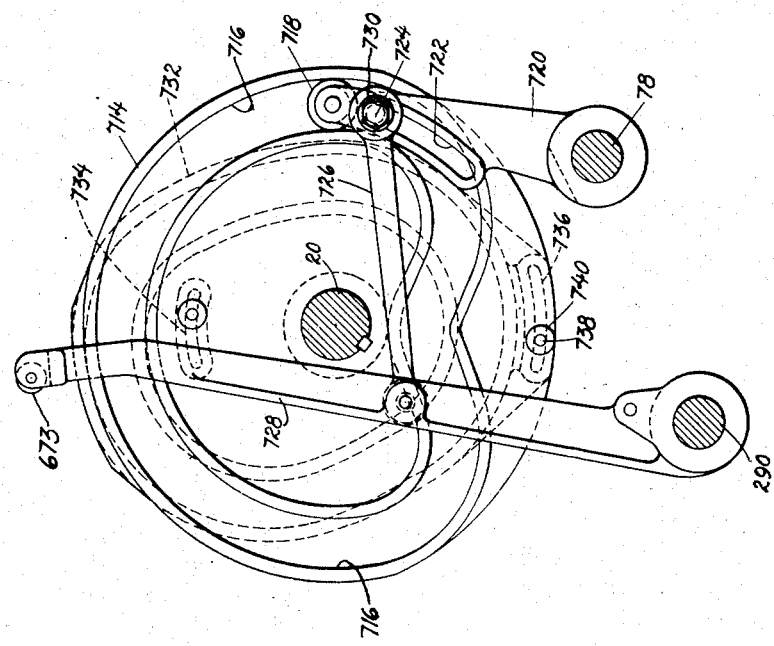
INVENTOR
JAMES J. McGINLEY
BY Wentworth B. Clapham
ATTORNEY Sept. 1, 1953   J. J. McGINLEY   2,650,459
WRAPPING MACHINE
Filed May 17, 1947   13 Sheets-Sheet 12

INVENTOR
JAMES J. McGINLEY
BY Wentworth B. Clapham
ATTORNEY

Sept. 1, 1953  J. J. McGINLEY  2,650,459
WRAPPING MACHINE
Filed May 17, 1947  13 Sheets-Sheet 13

INVENTOR
JAMES J. McGINLEY
BY
ATTORNEY

Patented Sept. 1, 1953

2,650,459

UNITED STATES PATENT OFFICE 2,650,459

WRAPPING MACHINE

James J. McGinley, Williston Park, N. Y., assignor to American Machine and Foundry Company, a corporation of New Jersey Application May 17, 1947, Serial No. 748,715

12 Claims. (Cl. 53—110)

This invention relates to wrapping machines and more particularly to wrapping machines which can be adapted to wrapping different kinds and sizes of articles, preferably at a high rate of speed.

In modern wrapping machines it is highly desirable that the associated parts thereof be so constructed and arranged that whenever an article is improperly fed into the machine, the operation can be stopped before serious damage and breakage of machine parts occurs. For example, in wrapping bread, experience has shown that occasionally misshapen or crippled loaves are fed into the machine thereby causing jams to occur which result in breakage of machine parts.

The present invention solves this problem by providing mechanism which incapacitates article transferring parts and effectively cuts out the machine before substantial damage can take place. At the same time it is possible after the removal of an imperfect article being packaged to quickly reinstate the normal operative cycle of the machine so that very little time is lost.

The machine comprising the present invention is extremely accessible for repairs and adjustments and for threading the web of paper for replenishing the same.

Improved and better appearing packages are also obtained because of the fact that my improved folding and sealing mechanisms are such that each fold is positively acted upon and sealed as an article progresses through the machine. For example, in the case of relatively irregular articles, such as sliced or unsliced loaves of bread, the manner in which the projecting end portions of each wrapper are folded and sealed results in extremely uniform and well-sealed packages.

The invention also consists in the provision of novel end folders and bottom seam sealing and pressing mechanisms so positioned in the path of travel of a package through the machine that as each fully wrapped and sealed package issues from the machine, the end and bottom folds are more securely sealed together and, therefore, the number of rewraps is reduced to a minimum.

In many existing wrapping machines, succeeding packages engage and push a previously acted upon or partially wrapped package along the foldway, through the sealing chute and out of the machine. This is generally a disadvantage, especially at the end of a run where it is necessary for the operator to remove packages manually from the machine, otherwise the last packages of a run would be scorched or burned. The present invention solves this problem by providing conveying mechanism which moves each article progressively and continuously through the foldway and past the end sealing mechanism of the machine. In this way all end folds and bottom seams are positively sealed and set and there is no danger of burning either of the end or bottom seams or otherwise damaging the articles being wrapped.

It is an object of this invention, therefore, to provide a high-speed, versatile wrapping machine which can wrap a large number of articles such as cartons, boxes, sliced and unsliced loaves of bread, and other articles.

It is a further object of my invention to provide an improved wrapping machine having means for automatically preventing breakage of machine parts in the event that articles are improperly introduced into the machine from the infeed conveyor and/or onto the article transferring mechanism which delivers a partially wrapped article to the final folding and sealing mechanism.

It is a further object of my invention to provide improved end folding and sealing mechanisms which exert a more positive control on the end folds of each package being formed as it progresses through the foldway.

The invention also contemplates the provision of mechanism for acting on the bottom seams of packages being formed in that there are provided means for heat sealing the wrappers along the longitudinal or bottom seam of each package and acting in conjunction therewith are presser fingers which positively locate the abutting longitudinal seam forming portions of each wrapper in proper sealing relationship as each package passes through the folding and sealing mechanisms.

The invention also consists in the provision of interconnected adjusting mechanism which makes possible the lateral adjustment of several folders along the foldway as well as the cooling and sealing mechanisms, and simultaneously therewith the lateral adjustment of the article pusher flights which move articles being wrapped through the foldway between the cooling members and out of the machine. This arrangement makes possible the engagement of the article forwarding flights with each article being wrapped at points where the best possible conveying effect can be obtained with little or no distortion of the article being translated by the pushers. In relatively soft, compressible articles such as sliced or unsliced loaves of bread, the conveying mechanism of this invention and the hold-down plates forming a part thereof contribute materially to the formation of uniform packages with a minimum amount of damage to each article being wrapped.

The invention also consists in the provision of improved wrapper feeding and tensioning mechanism which operate automatically to feed a length of wrapper web necessary to completely enwrap an article, and in addition is operative to feed an additional length of wrapper web requisite to form a package in which the encircling wrapper is tensioned thereabout according to predetermined requirements.

Other objects of my invention will be set forth in the following description and drawings which illustrate preferred embodiments thereof, it being understood that the above statement of the objects of my invention is intended generally to explain the same without limiting it in any manner.

In the accompanying drawings which illustrate a preferred embodiment of the invention and form a part of this specification, and in which like characters of reference indicate the same or like parts:

Figure 2 is a front view taken on line 2—2 of Figure 1;

Figure 3 is a side view of the main or top conveyor and mechanism for adjusting the tucker plates, folders, heat sealers, coolers and the article pusher arms in a transverse direction to accommodate different lengths of articles; also included is the driving means for the main cam shaft of the machine;

Figure 4 is a plan view of Figure 3;

Figure 5 is an enlarged detail view of the tucker adjusting mechanism;

Figure 7 is a front view of the gap closer and lap roller, and the wrapper tension control mechanism;

Figure 8 is a side view of the wrapper tension control mechanism;

Figure 9 is a plan view of the lifter table equipped with an improved back tension plate unit;

Figure 10 is a side view, partly in section, taken from line 10—10 of Figure 9;

Figure 11 is a partial end view taken on line 11—11 of Figure 10, showing the manner of mounting the back tension plate;

Figure 12 is a detailed side elevation of the article pusher arms, its top tension plate, and means for actuating the tension plate;

Figure 13 is an end elevation of Figure 12, as seen from line 13—13 of Figure 12;

Figure 14 is a detail view illustrating the manner of mounting the folder plates;

Figure 15 is a detail view showing the manner of mounting the cooling plates so that they may be adjusted to engage the ends of the article with a desired pressure to assure a perfect seal; also included is the means for adjusting the article pusher arms;

Figure 16 is a side view of a modified, adjustable actuating mechanism for the article ejecting device;

Figure 17 is an end elevation of Figure 16;

Figure 1:
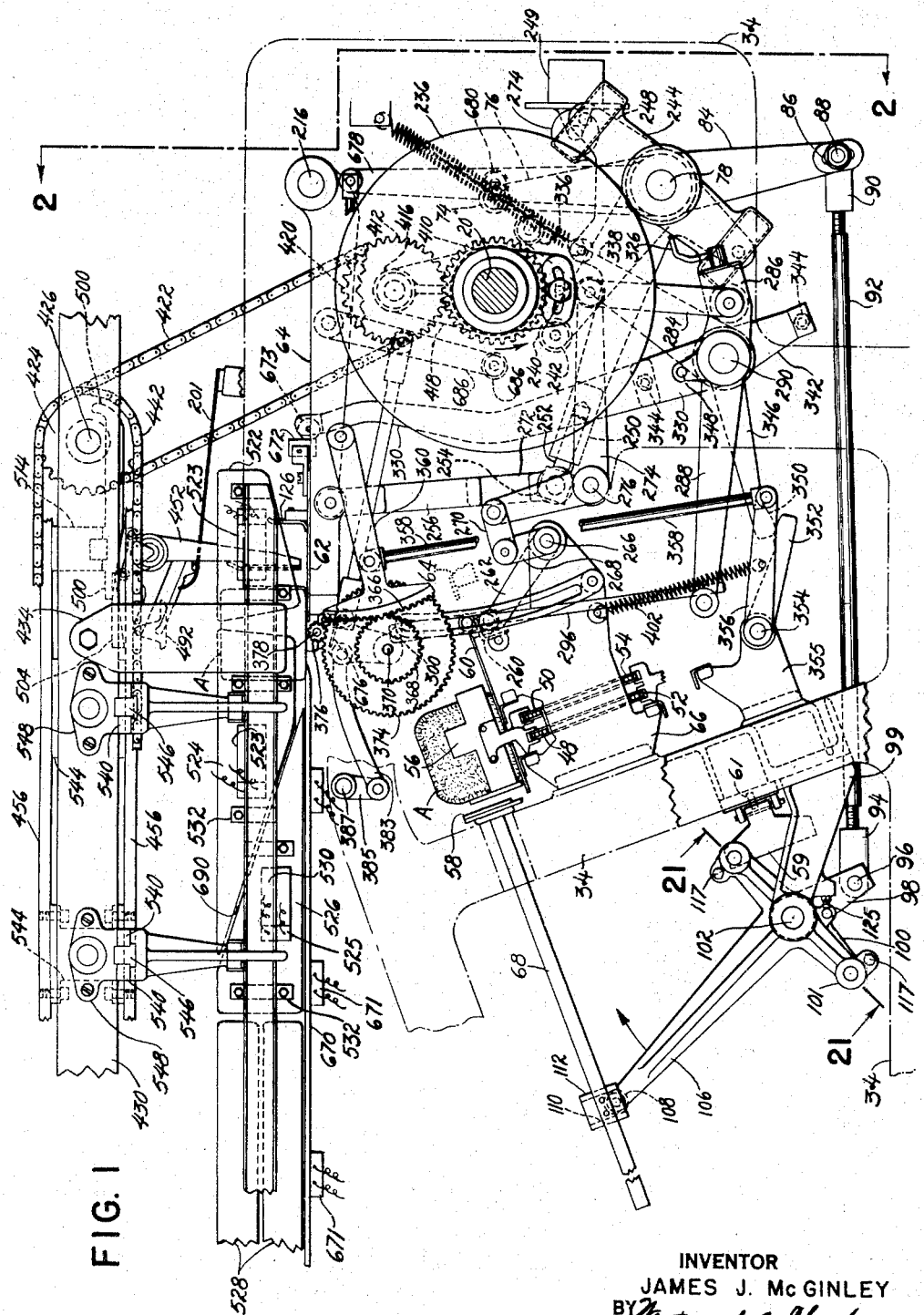
Figure 1 is a side view of a portion of the improved high-speed wrapping machine.

Referring to Figures 1, 2 and 3 of the drawings, the machine is driven by a motor 24 mounted on bracket 38 attached to side frame 34. Motor 24 drives a pulley 26 of a variable speed drive on which runs a belt 27 running on pulley 28 fixed to a shaft 30 which by suitable conventional gearing in housing 22, attached to frame 34, drives cam shaft 20.

One end of shaft 30 is mounted in a bearing 40 on side frame 34; its other end is journalled in a bearing 42 of gear housing 22. One end of shaft 32 protruding from housing 22 is mounted in bearing 44 of housing 22; its other end is journalled in bearing 46 on side frame 34. A crank 21 (Figure 3) secured to the driving means in housing 22 enables the turning of the machine by hand.

Conventional indexing mechanism enclosed in housing 22 drives shaft 32, effects an intermittent drive of the article infeed conveyor, designated generally at 47, which advances articles into the machine for wrapping. Conveyor 47 consists of a pair of endless chains 48 and 50 running over driven sprockets 52 and 54 (Figure 8) fastened to shaft 32, and over idler sprockets (not shown). Spaced article engaging flights 56 are attached to chains 48 and 50. An article positioned between flights 56 is moved inwardly into the machine in a step by step fashion and located in the path of reciprocating plunger 58. At the proper time plunger 58 advances, removes the article from conveyor 47 and propels it over platform 60 onto a plate 62 of lifter table 64 when the latter is in its article receiving position. Platform 60 is supported by the infeed brackets 66 secured to the side frames 34 and 36, respectively.

Plunger 58 is attached to reciprocating bar 68 which receives motion from cam 70 keyed on cam shaft 20 provided with a track 72 in which engages a cam follower 74 (Figures 1 and 2) carried at the upper end of a cam lever 76. Lever 76 is fulcrumed on a stationary shaft 78 supported in brackets 80 and 82 carried by the side frames 34 and 36, respectively. Lever 76 has an arm 84 provided with a slot 86 (Figure 1) adapted to receive a stud 88 supporting a head 90 which carries one end of an adjustable rod 92. The other end of rod 92 is connected to a head 94 mounted on a stud 96 in an arm 98 depending from a driving member 100 loosely mounted on shaft 102 and yieldably attached to a cross arm 101 carrying an arm 106 projecting upwardly towards plunger bar 68. Shaft 102 is mounted in bearing brackets 99 attached to side frames 34, 36. The upper end of arm 106 supports a roller 108 adapted to engage in a track 110 of a member 112 secured to pusher bar 68. In this manner reciprocating motion in timed relation with the movement of conveyor 47 is imparted to the ejector plunger 58.

Figure 21:
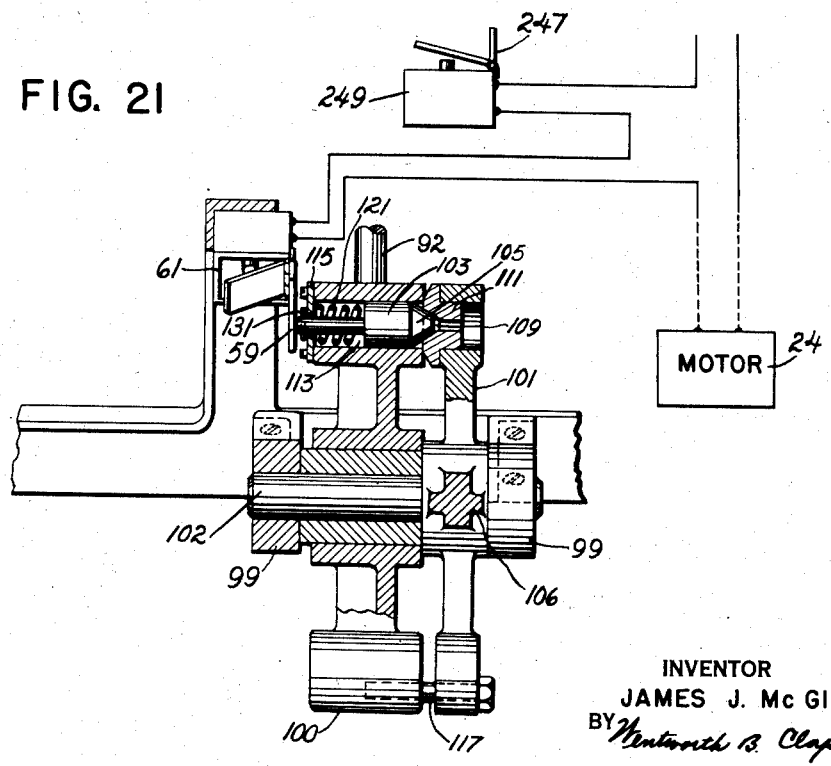
Figure 21 is a sectional plan view, taken on line 21—21 of Figure 1, of the article pusher arm hook-up, illustrating the safety switch of the same as well as the safety switch of the lifter table in connection with the main motor control of the machine.

In feeding articles to be wrapped into the machine, occasionally it happens that an article is improperly positioned relative to pusher 58. For example, in the case of wrapping loaves of sliced bread, a loaf or slices thereof may be improperly delivered between flights 56. When pusher 58 engages and pushes such a loaf towards lifter table 64, a jam occurs, and breakage of parts may result. In order to prevent this from happening the mechanism for operating pusher 58, described hereinabove, includes a safety throwout clutch. Referring to Figure 21, it will be seen that driving member 100 is provided with a spring mounted plunger 103 having a tapered head 105 which during normal operation of the machine engages with a recess 109 formed in a socket 111 carried by the driven cross arm 101. The straight end of plunger 103 protrudes from a cover plate 115 which confines plunger 103 and a suitable spring 121 in a hole 113 of member 100 normally urging head 105 into engagement with recess 109. The protruding end of plunger 103 is provided with a stop pin 131 which secures plunger 103 in operative position in hole 113. Whenever a jam occurs sufficient to disengage the driving connection between driving member 100 and cross arm 101, the protruding end of plunger 103 is pressed inwardly (to the left as viewed in Figure 21) by the camming action of recess 109 thereby momentarily tripping switch plate 59 as tapered head 105 is forced out of recess 109 of socket 111 of cross arm 101. The action causes the disconnection of pusher arm 106 from its source of power and also stops the entire machine due to the tripping of switch 61 by plate 59. In this manner the forward movement of pusher 58 is arrested immediately and breakage of parts is prevented.

In order to assure proper aligning of tapered head 105 with recess 109 of socket 111 while reengaging the same, cross arm 101 is provided with a pair of studs 117 protruding in the path of a pair of corresponding lugs of driving member 106 (Figures 1 and 21). To limit the movement of cross arm 101 after disengagement from driving member 100, an adjustable stop screw 125 held by bracket 99 is provided.

The wrapper web W is unwound from a reel R, led around roller 114 upwardly over roller 116 around a floating roller 118 and upwardly over a guide roller 120. Rollers 114, 116 and 120 are supported on stationary shafts supported in frames 34, 36. Roller 118 is mounted on shaft 119, the ends of which are free to slide in slots 121 of guides 123 fixed to side frames 34, 36. The leading end of the wrapper web is passed over a paper runway 122, and is draped from a cross rod 124 in the path of an article, as it is transported from the runway plate 60 by pusher 58 onto lifter table 64. In this manner the wrapper W is partly wrapped around an article as it comes to rest on the table.

An article A on being moved onto plate 62 of table 64 engages a back-tension plate 126 which is then adjacent the article receiving edge of plate 62, as shown in dotted lines in Figure 9. As the result of the forward movement of plunger 58, article A and back-tension plate 126 move forward in unison and at the completion of the stroke of plunger 58, an article A, partially enveloped by a wrapper web, rests on the table 64 (as shown in Figure 9). The back-tension plate 126, which has reached its rearmost limit of travel, backs up the partially wrapped article and prevents slippage of the wrapper relative to the article, both during its movement onto table 64 and its transfer therefrom to its point of delivery to the final folding and sealing mechanisms.

Back-tension plate 126, selected for purposes of illustration, is provided with several improvements to overcome difficulties encountered in previous machines.

Experience has shown that the relatively high velocity impact of articles against the back-tension plate and the momentum imparted to the back-tension plate in prior structures tended to cause this plate to be moved momentarily away from a partially wrapped article during part of its movement onto the lifter table. This loss of contact between known types of back-tension plates and an article being wrapped often resulted in a slippage of paper and, consequently, misplacement of the bottom laps of a wrapper relative to the article being wrapped.

The improved back-tension plate assembly shown in Figures 9, 10 and 11 consists of a generally L-shaped plate 126 detachably secured to supporting lugs 128. To facilitate the removal and replacement of different sizes of back-tension plates 126 in order to accommodate different lengths of articles, each plate 126 is provided with spaced studs 130 each of which supports a knurled spring-tensioned lock knob 132. Knobs 132 have an aperture 134 adapted to receive a spring 136 which is backed by a washer 138 and retained in place by a pin 140. To remove plate 126, the operator of the machine grasps knobs 132, pulls them sufficiently to clear slotted sockets 142 provided in holder 128, and then lifts the plate whereby studs 130 are freed from guide slots 144 in support 128. Support 128 is equipped with a pair of extending lugs 146 and a second pair of spaced extending lugs 148, the former being supported by the upper ends of links 150 which are connected to lugs 152 projecting from a base 154 attached to a slide plate 156. Between lugs 148 and pivotally connected thereto is the upper end of an arm 158 which is fulcrumed on a stud carried by a forked lug 160 extending upwardly from base 154. The upper portion of flat spring 162, attached to lug 160, presses against arm 158 and maintains plate 126 in a substantially vertical position. A substantially horizontal arm 164 projecting from member 158 carries a stop screw 166 whereby a predetermined spacing or clearance can be maintained between the base 154 of back-tension plate 126 and article supporting plate 62 of lifter table 64.

Base 154 is provided with a stud 168 adapted to engage a screw 170 threaded in a block 172 of a stud 174 attached to lock bar 176 which operates in conjunction with slide plate 156. Slide plate 156 has a cut-out portion 178 adjacent lock bar 176 permitting movement of the latter for reasons to be mentioned hereinafter. Plate 156 also has a cut-out portion 180 adapted to receive an anti-friction member such as a roller 182 serving to engage the tapered face 184 of lock bar 176. Compression spring 186 located in the space 188 between slide 156 and lock plate 176 is provided to normally hold the lock plate 176 out of engagement with roller 182. Spring 186 is arrested between roller 182 and ledge 190 of plate 176. Roller 182 and spring 186 are kept in place by top and bottom cover plates 194 and 196, respectively, suitably attached to the slide plate 156. Slide plate 156 and lock bar 176 travel in spaced slide rails 200 suitably secured to lifter table 64.

The back-tension plate 126 in the device illustrated is mounted on slide plate 156 by the parallel motion linkage heretofore mentioned, so that pressure of an article against the plate 126 operates the lock bar 176 by means of stud 168 and screw 170. If the velocity of the tension plate 126 tends to exceed that of the article, due to the impact, the slide 156 moves and the tension plate remains in contact with the article due to the unique yielding mounting, thus described. The impact of the article against the plate 126 causes stud 168 to strike screw 170 thus giving the lock bar 176 a kick which releases momentarily the braking action of roller 182 with surface 184. However, any run away of slide 156 will be of short duration as the spring 186 tends to push against the lock bar 176 causing the tapered surface 184 to wedge roller 182 to stop the travel of the slide. Normally, the engagement of an article with plate 126 brings stud 168 into engagement with screw 170 and releases lock bar 176 from roller 182 so that the slide advances in unison with the advancing, partially wrapped article. With the article kept under control at all times against the back-tension plate, slipping of the wrapper partially encircling an article is practically impossible. Therefore, the position of the under-lap of a wrapper will remain in its desired predetermined position relative to the underside of each article moved by pusher 58 onto lifter table 64.

As an article A is moved onto lifter table 64, a pair of tucker plates 202 and 204 (Figure 4) move in, engage and fold extending web portions of the wrapper partially encircling the article against the ends thereof. Tuckers 202 and 204 are fastened to levers 206 and 208, respectively, fulcrumed on studs 210 carried by bearings 212 and 214, slidably mounted on a cross shaft 216 supported in frames 34, 36. Each of the levers 206 and 208 has an arm 218 pivotally supporting a head 220 having a slot (not shown) adapted to slidably engage a cross bar 222. Bar 222 is secured to a cross bar 224 (Figure 2) carried by a lug 226 which extends from a bearing 228 of a cam lever 230 fulcrumed on shaft 216 and provided at its lower end with a cam follower 232 (Figure 2) engaging a cam 234 secured to cam shaft 20. The oscillating motion imparted to cam lever 230 causes bar 222 to swing levers 206 and 208 and thereby move tucker plates 202 and 204 into and out of contact with the articles being wrapped.

The swinging motion of the lifter table 64 is effected by cam 236 keyed on cam shaft 20 (Figure 2). Cam 236 has a track 238 engaged by cam follower 240 carried by an arm 242 projecting from a member 244 fulcrumed on shaft 78. A member 248 also fulcrumed on shaft 78 is yieldingly attached to member 244 for reasons described hereinafter. An arm 250 projecting from member 248 (Figure 1) is provided with a stud 252 terminating in a head 254 which supports the lower end of a link 256 pivotally connected to lifter table 64 which is fulcrumed on shaft 216.

Figure 6:
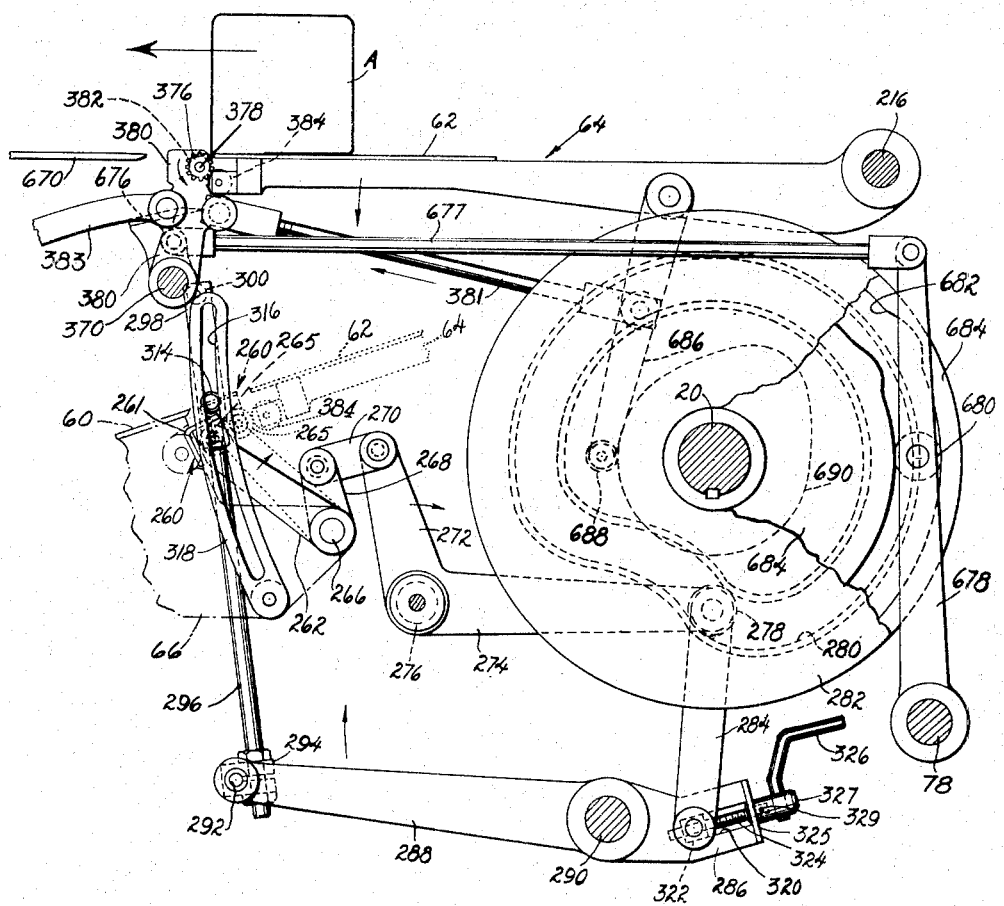
Figure 6 is a side view of the improved gap closer, knife and lap roller mechanism.

When the lifter table 64 is in its down or article receiving position (shown in dotted lines in Figure 6), there is a gap or space between the table and the runway plate 60. Therefore, in order to furnish proper support for articles moving from runway plate 60 onto the lifter table, a gap closer 260 is provided. The gap closer comprises a plate 261 (Figures 6 and 7) which is fastened to the upper portions of arms 262 and 264 secured on a cross shaft 266 carried by brackets 66. Shaft 266 also supports a fixed arm 268 (Figures 1, 6 and 7) connected by a link 270 to an arm 272 forming a part of lever 274 fulcrumed on shaft 276 supported in side frame 34. Lever 274 is provided with a cam follower 278 engaging in a track 280 of a cam 282 keyed on cam shaft 20. Lever arm 274 is pivotally connected to the upper forked portion of an arm 284 adjustably connected to a tail 286 of lever 288 secured to a cross shaft 290 supported in bearings of the side frames 34 and 36. The other end of lever 288 carries a stud 292 on which is mounted a head 294 adjustably supporting the lower end of a rod 296 connected to a bar 298 carrying one end of a lap roller 300 (Figures 6 and 7). The opposite end of lap roller 300 is supported by a bar 302 attached to rod 304 connected to a head 306 mounted on a stud 308 projecting from an arm 310 (Figure 7) secured to shaft 290 and arranged to operate in unison with arm 288. A stud 312 suitably secured to each of the bars 298 and 302, as by riveting, has an extending tip or follower 314 engaging in an arcuate slot 316 provided in each of the guide members 318 fastened to brackets 66 of the machine.

In order to adjust the stroke of lap roller 300, and thereby control the amount of paper pulled from the source of supply and draped in the path of the next article to be wrapped, the tail 286 of arm 288 is provided with a slot 320 in which is slidably mounted a block 322. The block 322 is threaded so as to travel to and fro when a spindle 324 is turned by crank handle 326. Spindle 324 projects through an opening in plate 325 secured to tail 286. Crank 326 is mounted in a hub 327 attached by a pin 329 to spindle 324.

When a partially wrapped article A has been delivered by pusher 58 onto plate 62 of lifter table 64, the latter moves from article receiving position upwardly to article delivering position wherein plate 62 is substantially co-planar with bottom plate 670, described hereinafter, which forms a part of the final bottom folding mechanism.

In wrapping some articles, especially loaves of bread, it is often very desirable that wrappers be fairly loosely encircled about the loaf. In this way a more pleasing appearance is obtained, and at the same time danger of substantial constriction and crushing of relatively soft loaves of bread is eliminated. In order to solve this problem there has been provided mechanism for controlling the looseness or tension of wrappers encircled about each article wrapped.

The mechanism for regulating the tension or looseness of a wrapper operates in conjunction with an article ejector arm 330 fulcrumed on shaft 290. Arm 330 is actuated from a cam 332 keyed on shaft 20, having a suitable track 334 engaged by cam follower 336 carried at the upper end of a cam lever 338 loosely mounted on shaft 290. The hub 340 of lever 338 is formed with a flange 342 providing means for fastening lever 338 to arm 330 by means of screws 344. An arm 346 (Figures 1, 7 and 8) loosely mounted on shaft 290 is coupled to arm 330 by means of a stud 48. Therefore, the movement of arm 330 imparts swinging motion to arm 346. Arm 346 is so arranged that its extending end 350 travels in an arcuate path and engages an arm 352 fastened on shaft 354 rotatably supported in bracket 355 fixed to side frame 34. A second arm 356 also fastened on shaft 354, supports one end of a link 358 connecting to a gear segment arm 360. When arm 346 descends and presses against arm 352, the latter will be depressed thereby causing arm 356 also to descend whereby gear segment arm 360 swings downwardly. Arm 360 is loosely mounted on a stud 362 supported by a bracket 364 secured to frame 34 of the machine. The opposite end of arm 360 is provided with a gear segment 366 meshing with and driving gear 368 loosely mounted on a stud 370 projecting from the side frame 34 of the machine. The turning of gear 368 in a clockwise direction (as viewed in Figure 8), through a conventional one-way clutch, such as ball clutch 372, imparts motion to gear 374 also loosely mounted on stud 370, which in turn drives pinion 376. The driving part of clutch 372 is connected to gear 368; the driven part is attached to gear 374. On the return stroke of segment 366, gear 368 turns in a counter-clockwise direction (as viewed in Figure 8) and the driving means of clutch 372 is disengaged whereby gear 374 and pinion 376 remain motionless. Pinion 376 is fastened on the end of a shaft 378 carried by swinging brackets 380 loosely mounted on studs secured in side frames 34, 36. Shaft 378 supports a web-feeding device, preferably a plurality of axially spaced rollers 382 secured thereto, which when shaft 378 is rotated and rollers 382 engage with roller 384 carried by the lifter table 64, feed additional wrapper web for the article being wrapped.

The amount of additional wrapper fed is controlled by means of a hand wheel 386 which provides means for changing the position of arm 352 so that, more or less time elapses between intervals of engagement during a wrapping cycle of arms 346 and 352. It will be seen that an early engagement of these arms during a wrapping cycle will cause a greater movement of the gear segment 366 which will result in feeding more additional wrapper web to complete the enwrapping of an article than when the engagement of the arms is retarded. The turning of handwheel 386 raises and lowers a threaded spindle 388 which is guided in a bracket 390 attached to the frame 34 of the machine. The lower end of spindle 388 terminates in a slotted head 392 receiving a T-head 394 which is part of a guide rod 396. Rod 396 slides in a head 398 pivotally supported in arm 360. A compression spring 400 encircling rod 396 rests against the top of head 398. On the return stroke of arm 360, spring 400 engages the base of T-head 394 and stops the ascent of arm 360. The return of arm 360 and its coacting members is achieved by a compression spring 402 stretched between a post 404 in arm 356 and a post 406 in the bracket 66. It is well to mention that the tension of spring 400 is great enough to overcome the pulling action of spring 402, in this manner the arm 360 and arm 352 return to their starting position, in readiness for the next cycle of the machine.

The swinging arms 380 which carry the auxiliary feed roller 382 are actuated through a connecting rod 381 by a cam lever 686 having a follower 688 engaging an open cam 690 on shaft 20. In order to assure a correct parallel movement of shaft 378 and roller 382, each arm 380 carries a link 383 (Figures 7 and 8), each of which is connected to a lever 385, both of which are secured to a cross shaft 387 supported by suitable bearings in side frames 34 and 36.

A gear 410 secured near one end of cam shaft 20 (Figures 1 and 2) drives a gear 412 mounted on a stud 414 supported in a bearing 416 of a bracket 418 attached to side frame 36. A sprocket 420 also mounted on stud 414 drives a chain 422 running over a sprocket 424 fastened at one end of a shaft 426 which drives the top conveyor mechanism. Driven shaft 426 (Figures 3 and 4) and an idler shaft 428 of the conveyor are supported by spaced bars 430 and 432, respectively, each of which is carried by brackets 434 and 436 secured to their respective side frames 34 and 36. Shaft 426 is equipped with a pair of spaced sprockets 438 and 440 driving spaced endless conveyor chains 442 and 444, respectively, running over sprockets 446 and 448 mounted on shaft 428. Chains 442 and 444 carry a plurality of spaced cross bars 450 (Figure 4), each bar 450 being provided with a pair of spaced pusher arms 452 and 454 adapted to engage and propel articles being wrapped, through the foldway, and the sealing section of the machine.

Article pusher arms 452 and 454 are guided for movement through the foldway and sealing section of the machine by laterally adjustable longitudinal rails 456 and 458.

Figures 12, 13 and 15 show an enlarged scale of one of the pushers 452 and its coacting members. Pushers 454 are of the same construction and operation, except that as shown in the plan of Figure 4. Pushers 452 can be called left-hand members, whereas pushers 454 are right-hand members. Since all pushers are of the same general construction, except as noted, description and detailed showing of one pusher 452 are deemed sufficient for a clear understanding. The upper end of pusher arm 452 is provided with a hub 460 fitting over a sleeve 462 having a square hole to suit the cross-section of bar 450. The hole in sleeve 462 has sufficient clearance to permit it to slide on bar 450 so as to enable the arms 452 and 454 to be adjusted laterally to accommodate different length articles. Sleeve 462 has a flange portion 464 providing means for securing the same to arm 452. A disc 466 spaced from flange 464 is retained in position by a split lock ring 468 which fits into an annular groove in sleeve 462. The rails 456 and 458 engage with the space between members 464 and 466 and as heretofore mentioned, maintain pushers 452, 454 in predetermined lateral position for moving articles through the foldway, the sealing section and out of the machine. An arm 470 loosely mounted on sleeve 462 is retained in position by a split lock ring 472 fitting into an annular groove in sleeve 462. Arm 470 at its lower end carries a roller 474 engaging a surface 476 of an arm 478, the engagement of roller 474 with surface 476 locks arm 478 in its raised position (as shown in full lines in Figure 12). Arm 478 and a coacting arm 480 are pivotally mounted on studs 482 and 484, respectively, extending from pusher arm 452. The opposite ends of arms 480 and 482 connect to their respective studs 486 and 488 carried by a vertically extending ear 490 of a plate 492 which bears against the top of each package A. It will be seen that the above-mentioned linkage will impart parallel motion to the plate 492 when the locking mechanism, previously mentioned, is unlocked, and permits the plate 492 to descend to engage the top of the article (as shown in dotted lines in Figure 12). In this manner each partially wrapped package being advanced by pushers 452, 454 is maintained in proper position for wrapping and sealing. Plates 492 press against the top of each package being wrapped adjacent the ends thereof, and at the same time pushers 452, 454 bear against the rear side of the package and advance it through the machine. This arrangement prevents arching of the article while being advanced and allows the ends of each package being formed to remain in substantially complete engagement with the several folders, sealing and cooling members as it travels through the machine. In this way an extremely uniform square and folds result.

Arm 470 is provided with a roller 494 to return members 474 and 476 to a locked position, and a roller 496 is provided to unlock these members at the desired predetermined time to permit the descent of plate 492. As the pusher arm 452 approaches the article pick-up station adjacent the delivery station of lifter table 64, trailing rollers 494 on arm 470 engage surface 498 of a cam piece 500 whereby roller 494 is depressed thereby rocking arm 470 and causing lock roller 474 to ascend and return the mechanism of plate 492 to its up and locked position. Referring to Figure 1 it will be seen that plate 492 is in its up-position to clear an article A as a pair of pushers 452 and 454 advance to engage a partially wrapped article delivered from lifter table 64 onto support plate 670. The continued advance of pushers 452, 454 brings the leading roller 496 into engagement with surface 502 of a cam piece 504 at approximately the time the pusher encounters the article to propel the same through the foldway of the machine. The engagement of roller 496 with the inclined cam track 502 urges roller 496 downwardly. This movement causes top tension plate 492, with the aid of a tension spring 506, to descend and bear against the top of the article being conveyed. When each plate 492 is so positioned, a pressure will be maintained on the article thereby tending to insure a perfect seal of the bottom lap of the wrapper web. Spring 506 is stretched between posts 508 and 510, the former being carried by an extending arm 512 of arm 480; the latter being attached to arm 470. Cam piece 500 is suspended from the upper run of rail 456, for this purpose a block 514 is secured to the rail and provided with screws 516 for fastening the cam piece 500. Cam piece 504 is attached to the top of the lower run of rail 456 by screws 518. The rails 456 and 458 are slidably mounted for lateral adjustment on a plurality of transverse guide rods 520 (Figures 3 and 4) suitably supported in side bars 430, 432.

Spaced sets of folder plates 522, 524 and 526, and also end fold heater members 528 are carried by U-shaped channels 530 so spaced as to have these attached members engage the ends of the articles. Channels 530 are provided with a plurality of lugs 532 so arranged as to carry the individual folder plates. Lugs 532 may be welded or otherwise suitably secured to member 530. The top of each channel is provided with ears 534 adapted to engage hubs 536 of hangers 538 suspended from slide bars 540 (as seen in Figures 3, 4 and 14). Each slide bar 540 at its inner end is provided with a notch 542 fitting over the lower run of rails 456 and 458, the bars are held in position by blocks 544 secured to the upper and lower runs of rails 456 and 458. The outer ends of bars 540 slide on the ledge portion of a T-shaped block 546 that is secured to the brackets 548 attached to their respective bars 430 and 432.

At the rear end of the machine (Figures 3, 4 and 15) are located the cooling plates 550 (Figure 3) and the hot seal cooling members 552. The latter, which can be similar in construction and operation to those shown in Sticelber patent, No. 2,092,144, issued September 7, 1937, are secured to arms 554 depending from studs 556 adjustably carried by brackets 558 which are attached to slide bars 560, each of the latter at their inner ends having a notch 562 (Figure 15) fitting in rail 456, and retained in position by a block 564 carried in the same manner as the blocks 544, previously mentioned. The outer ends of slide bars 560 are guided on the ledge portion of a T-shaped block 566 which is secured to bracket 568 carried by the respective bars 430 and 432.

To facilitate the adjustment of tucker arms 202 and 204, folder plates 522, 524 and 526, heater plates 528, cooling plates 550 and 552, and pusher arms 452 and 454 to accommodate different length articles, the machine is equipped with a crank arm 570 (Figures 3 and 4) serving to readjust simultaneously the positions or spacing of the above-mentioned members to suit the length of article being wrapped. Crank arm 570 is secured to a shaft 572 supported in a bearing 574 of a bracket 576 attached to frame 34 of the machine. A sprocket 578 secured to shaft 572 drives a chain 580 running over a sprocket 582 secured on the end of a spindle 584. Spindle 584 is provided with right and left-hand threaded sections 586 and 588 which, on the turning of spindle 584 actuate their threaded followers 590 and 592, respectively. Follower lugs 594 and 596 which are parts of the members 590 and 592, respectively, engage groove portion 598 of members 212 and 214 which because of the adjustment described can be moved in and out, sliding on shaft 216 to adjust the lateral spacing of tucker plates 202 and 204.

A sprocket 600, also secured to shaft 572, drives chain 602 running over sprocket 604 secured on the end of spindle 606. A second sprocket 608 on spindle 606 drives chain 610 running over sprocket 612 fastened on spindle 614, the latter is also provided with a sprocket 616 driving chain 618 running over a sprocket 620 secured on spindle 622. Spindle 622 is also provided with sprocket 624 driving chain 626 running over a sprocket 628 secured on the end of spindle 630. It will be understood that the spindles 606, 614 and 622 and 630 have right and left-hand threads, the right-hand threaded section of each of the above spindles actuate a follower 632. The follower 632 (see Figure 15) has a shank 634 having internal and external threads, the former to engage the spindles and the latter to receive a lock nut 636 whereby the follower is clamped to the respective blocks 544 and 564. The left-hand threaded section of each of the above-mentioned spindles actuate a follower 638, similar in construction to follower 632, clamped by a lock nut 640 to blocks 544 and 564. When the spindles 606, 614, 622 and 630 turn, it will be seen that the rails 456 and 458 will be moved to or from each other thereby also simultaneously moving the above-referred to folder, heat sealers, cold plate and pusher arm assemblies.

Cooling plates 550 and 552 are mounted so that they may be moved in and out independently of the rest of the mechanism. This is accomplished by mounting brackets 554 on studs 556 (as seen in Figures 3 and 15). Each stud 556 has a threaded portion 658 engaging the threaded hub 660 of a sprocket 662 which engages with a chain 664 running over a sprocket 666 threaded on stud 556 of the bracket 554. By grasping and shifting chains 664, the members 552 are moved separately in and out to desired positions so as to engage the end of the articles with the desired pressure to insure a perfect seal of the wrapper. Studs 556 are guided in the bearings 668 of brackets 558. This adjustment is of great value when a change in wrapping material is made. For instance, in using moistureproof cellophane, it is not necessary to employ coating plates 550, 552 because of the rapid freezing characteristics of the moistureproof coating. In this case, therefore, plates 550, 552 are moved individually away from each other beyond the point of engagement with the ends of packages moving therepast. When wrapping material such as wax paper is used, however, it is desirable to use plates 550, 552 and they are advanced towards each other into package end engaging and coating positions.

The operation of the machine is briefly outlined as follows: Articles A to be wrapped are advanced intermittently by infeed conveyor flights 56 (Figure 1) to a position in the path of reciprocating plunger 58 which propels each article from the runway plate 60 onto lifter table 64 which is in its receiving position. Shortly before the advance of an article, gap closer 260 is moved to bridge the space between the runway and the lifter table. At this time lap roller 300 is positioned up of the gap closer 260. On approaching lifter table 64, article A encounters the draped end of the wrapper web and moves therewith against back tension plate 126 which slides backwardly as article A advances onto plate 62 of table 64 whereby the web is partly encircled about the article. With a partially wrapped article at rest on the table, tucker plates 202 and 204 are moved into position against the ends of the article to complete the first folds in the portions of the wrapper projecting beyond the ends of the article.

In order to prevent whipping of the ends of the bottom flap of the wrapper web during the tucking action and provide additional guiding means for said bottom flap as the article and wrapper web is pushed onto the lifter table, the gap closer plate supporting arms 262 and 264 carry a guide roller 265 which is attached to said arms by means of a pair of bearing plates 267 (Figure 7). This operation is due to the coaction between roller 265 and roller 384 on the article transfer or lifter table 64.

Article A is clamped on table plate 62 beneath top tension plate 201, plunger 58 retreats to its starting position, gap closer 260 also retreats whereby lap roller 300 begins to descend to its down position in readiness to engage the wrapper web W. Tension plate 201 which is operated from a suitable cam (not shown) may be of the same general construction as shown in Gladeck patent, No. 1,888,797. The lifter table 64 now ascends to its article delivery position, on approaching this latter position the spaced top end folder plates 522 engage the extending top ends of the wrapper and fold them downwardly against the ends of the article. If for some reason a partially wrapped article, on lifter table 64 should be improperly positioned or for some other reason should encounter an obstacle in its path of its upward travel, then yieldable mounting 244, heretofore mentioned, will become disengaged and further movement of the lifter table is halted. This is achieved by providing coacting members 244—246 with spring tensioned plungers 245, which when an overload occurs will snap out of its seat in member 244 and depress a plate 247 which operates a switch 249 in the motor circuit to stop the motor of the machine (Figures 1, 2 and 21). Infeed plunger 58 is also controlled in a similar fashion as described fully heretofore. In this latter case the spring mounted plunger 103 trips a hinge plate 59 which when depressed operates a switch 61 to stop the motor of the machine. It will be obvious that if an abnormal condition in the movement of articles by either pusher 58 or lifter table 64 or both occurs, the machine will stop and substantial damage will be obviated.

When lifter table 64 is located at the delivery position, article ejector arm 330 begins to advance to propel the article from table 64 onto a bottom plate 670 (Figure 1) of the machine. In advancing, roller 673 on arm 330 engages a fiber block 672 (Figures 9 and 10) carried by a holder 674 secured to back tension plate slide 156. In this manner the movement of slide 156 causes the back tension plate 126 to push the article from table 64. The movement of arm 330 causes the arm 346 to descend to engage and depress arm 352 thereby operating the wrapper tension control mechanism, described heretofore. The feeding cycle of the latter depends upon the setting of arm 352. An early engagement of arms 346—352 results in a loose wrap and a later engagement of said arms results in a tighter wrap. Said contact is established through arms 380 actuated through rod 321 by cam lever 686 and cam 690 due to the additional amount of wrapping material pulled by roller 322 contacting the roller 384 on lifter table 64. Any desired looseness of wrap can be obtained.

At the completion of the rearward stroke of arm 330, the partially wrapped article rests on bottom plate 670 ready to be passed between folder plates 524 and 526. In being delivered onto plate 670, the final bottom lap of the web is folded against the bottom of the article. Arm 330 and lifter table 64 now retreat to their starting positions to act on the succeeding article.

At approximately the instant lifter table 64 descends, a set of pusher arms 452 and 454 engage and transport the partially wrapped article through the foldway and sealing chambers of the machine. When pushers 452, 454 press against an article, the top tension plates 492 of the pushers descend and press on top of the article to insure perfect sealing of the bottom seam of the web. Shortly before the pushers 452 and 454 contact the article, a cam operated knife 676 severs the web w (Figure 6). Knife 676 through a connecting rod 677 is actuated by a cam lever 678 having a follower 680 engaging in a track 682 of a cam 684 on shaft 20. At the time of severing the web, roller 382 on arms 380 and roller 384 on lifter table 64 are motionless and hold the web clamped, lap roller 300 has descended and pulled additional web from the supply reel R in readiness for the succeeding article.

As the articles advance through the foldway between folders 524 and 526, the extending ends of the web of the wrapper engage in the inclined longitudinal space 690 between the folder members whereby the final flap of the wrapper is folded against the ends of the article. Folder plates 524 and 526 are provided with heaters 523, 525 which effect the initial heat sealing of the wrapper. On leaving the foldway the ends of the articles contact the heater plates 528 serving to seal the wrapper ends. The bottom lap of the wrapper is sealed as it passes along bottom plate 670 which has heaters 671. As the articles emerge from the heaters 528 they enter between the cooling plates which set the end folds of the wrapper. On leaving the bottom heater plate 670, the articles enter upon a continuous moving conveyor 692 which travels at the same speed as the pusher arm conveyor. Conveyor 692 is provided to cool the bottom seam of the package, and conveyor 692 is driven from shaft 428 of the top pusher arm conveyor. Shaft 428 is equipped with a sprocket 694 driving a chain 696 running over a sprocket 698 mounted on stud 700. The stud 700 is carried by a bracket 702 secured to one of the spaced tie bars 704 which support the cross shafts 706 and 708 of the conveyor 692. The shaft 706 is suitably driven from stud 700 by a gear drive (not shown), the shaft thus drives its pulley 710 imparting motion to conveyor belt 692 running over an idler pulley 712 on shaft 708.

Referring to Figures 16 and 17, the cam shaft 20 is provided with a cam 714 having a track 716 in which engages a cam follower 718. The follower 718 is carried at the upper end of a lever 720 mounted on shaft 78, said lever also has an arcuate slot 722 adapted to receive a stud 724. Stud 724 supports one end of a link 726 connected to the article ejector arm 728 loosely mounted on the shaft 290. The arcuate slot 722 provides means for adjusting the stroke of arm 728 in order to accommodate different size articles when set correctly. The rightening of a nut 730 retains the link 726 in position. It will be understood that the movement of arm 728 will operate an actuator arm in the same manner as heretofore mentioned by arm 330 to impart actuating means to the right and loose wrap mechanism. A cam 732, which in this modified form imparts motion to the reciprocating plunger 58, is provided with spaced arcuate slots 734 and 736. Studs 738 pass through the slots 734 and 736 and thread into the top holes provided in bosses 740 of cam 714. In this manner, by loosening studs 738, the cam 714 can be adjusted so as to change the timing of the engagement of arm 728 with the slide of the back tension plate previously described.

The modified pusher arm 728 is provided with a roller 673 at its upper end, adapted to engage the slide 156 of the back tension plate 126. In this manner the roller 673 engages the block 672 and actuates the slide 156.

Figure 18:
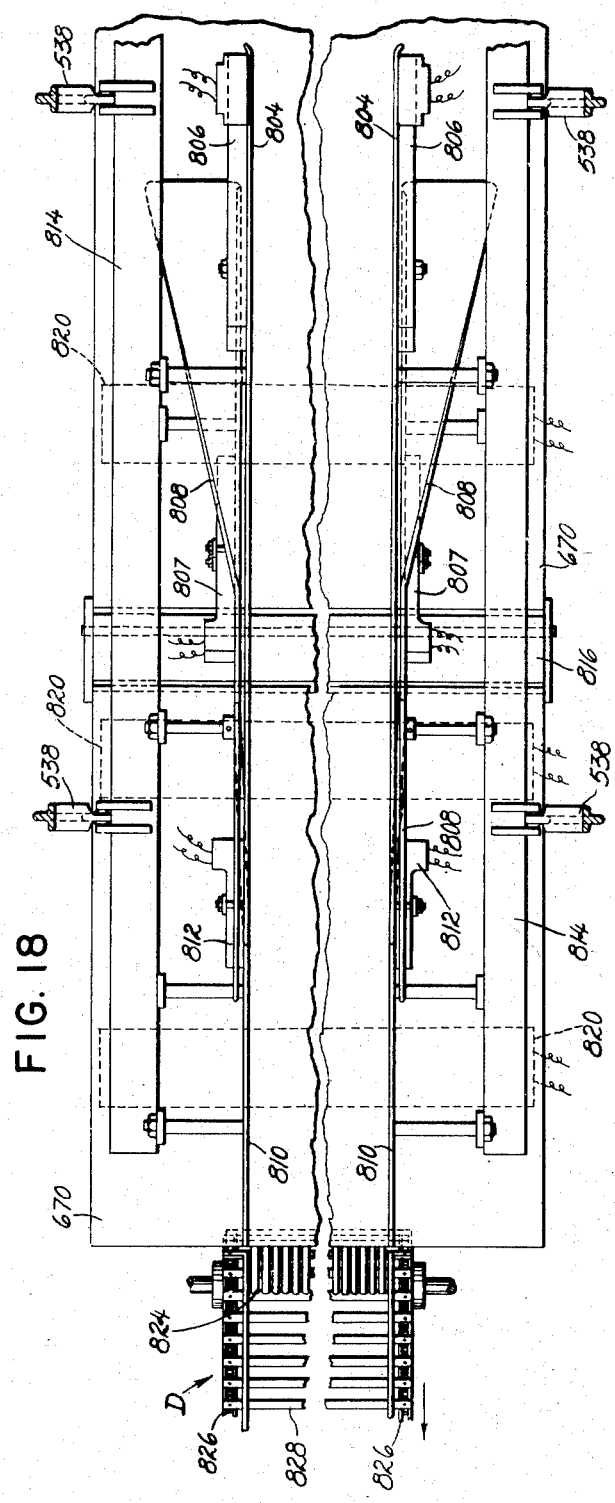
Figure 18 is a plan view of a modified form of end folders.
Figure 19:
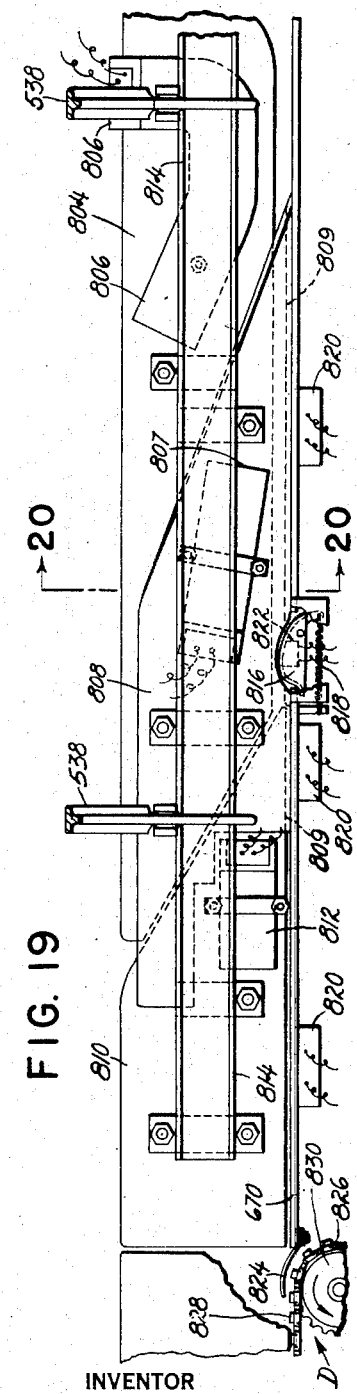
Figure 19 is a side elevation of the same.
Figure 20:
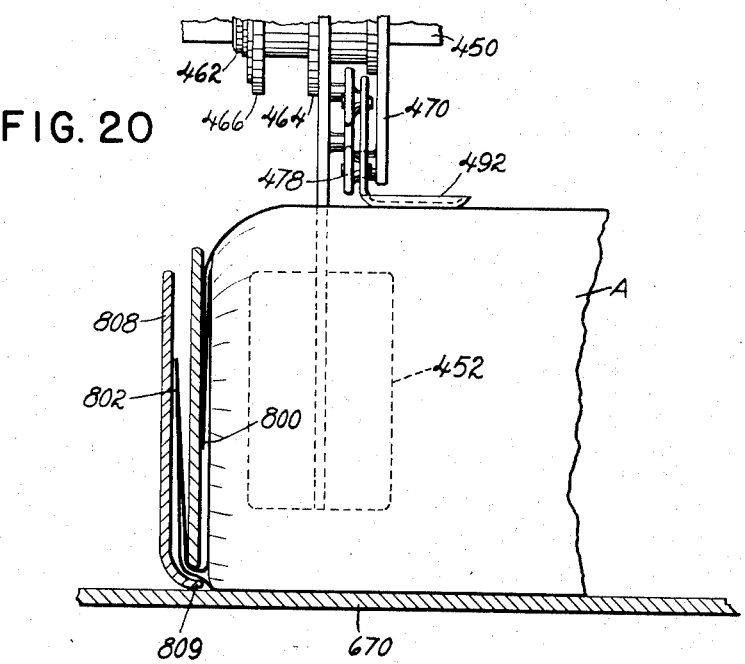
Figure 20 is a sectional end elevation of one of the modified end folder plates, taken on line 20—20 of Figure 19.

With reference to Figures 18, 19 and 20, the modified end folder plates are employed for the purpose of obtaining a better end seal of the package, especially when a heavy waxed paper or similar wrapping material is used. The main object is to seal the third or top end flap 800 (Figure 20) onto the already sealed two side end flaps before sealing the fourth or bottom end flaps 802 onto the third or top end flap 800, thus eliminating a high concentration of heat on the end seal of the package, which is necessary when all four end folds are made first and are then sealed. After leaving the folder plates 522 (Figure 4) which effect the folding and sealing of the third or top flap end fold 800, the latter contacts a pair of third fold auxiliary sealing plates 804 (Figures 18, 19 and 20) equipped with conventional heaters 806. Plates 804 are provided for the purpose of sealing the third end fold of the package securely to the already sealed first and second end folds, while the projecting bottom end flaps 802 protrude underneath plates 804 and contact the fourth end folder plate 808, which causes said flaps 802 to be folded upward on the rear side of each sealing plate 804, thus keeping the fourth fold away from the already made three end folds until the latter are sealed.

Each folder plate 808 is provided with a heater 807 employed for the purpose of readying the upward folded end flaps 802 for sealing against the second and third end folds of the package. The bottom edges of folder plates 808 are provided, furthermore, with a curved ledge 809 (Figure 20) which extend towards the bottom edge of the package, thus preventing the formation of a baggy bottom edge on the ends of the package when flaps 802 are sealed against said ends. Of course, due to the action of plate 492 of the pusher arms 452 and 454, the package is kept in steady contact with the bottom seal plate 670, which prevents said package to ride upon said ledge 809 of plates 808.

Upon leaving the fourth folder plate 808, the upwardly folded bottom end flaps 802 are guided onto the other already sealed end folds by means of the fourth folder sealing plate 810 which completes the end fold of the package. Sealing plates 810 are also equipped with suitable heaters 812. All folder and sealer plates in this modified arrangement are secured to a pair of supporting channels 814 which in the same manner as in the preferred form illustrated in Figures 3 and 4, are attached to the suspended hangers 538.

In order to effect a more perfect bottom seal of packages, especially in the wrapping of loaves of bread, the delivery runway or bottom seal plate 670 is provided with a pivotally mounted curved heater plate 816 equipped with a tension spring 818 which will follow the somewhat concave bottom surface of a wrapped loaf passing over plate 670 and thereby contact substantially all of the concave bottom surface of the package. The straight portions of the bottom surface are sealed by the support plate 670, which plate is provided with suitable heaters 820. Curved plate 816 has attached thereto a suitable heating element 822 (Figure 19). In order to insure that substantially every portion of the irregular bottom surface of a package, such as a wrapped loaf of bread, is sealed, adjacent the end of supporting plate 670 are mounted a number of closely spaced narrow sealing fingers 824 made of spring steel or similar material. The purpose of fingers 824 is to follow closely the bottom surface of each package passing thereover, and press the still tacky overlapping bottom seam portions of the wrapper into closer and more perfect sealing relationship. This operation results in an extremely uniform and tightly sealed longitudinal overlapping bottom seam.

Upon leaving the stationary bottom sealer or support plate 670, the wrapped articles are pushed onto a continuously moving cooling conveyor D (Figures 18 and 19) consisting of a pair of endless chains 826 carrying a number of spaced package supporting bars 828 employed for the purpose of quickly dissipating the heat from the freshly sealed bottom seam thereby materially aiding in the prevention of the undesirable opening of the bottom seam. The bars 828 also have a fan-like effect upon the bottom seal of the package, as the latter leaves plate 670. Endless chains 826 are supported and driven by suitable sprockets 830 in the same manner as the cooling conveyor 692 (illustrated in Figure 3) described heretofore. The sealing fingers 824 may also be employed in using the conventional cooling conveyor (shown in Figures 3 and 4) and are, therefore, also illustrated in said figures.

The invention above described may be varied in construction within the scope of the claims, for the particular device, selected to illustrate the invention, is but one of many possible concrete embodiments of the same. It is not, therefore, to be restricted to the precise details of the structure shown and described.

What I claim is:

1. In a wrapping machine, an article infeed conveyor, an article transfer, a guide surface for a wrapper, means for holding a wrapper on said surface with the leading end thereof draped in the path of travel of an article onto said transfer, a lap roller mounted for movement between said conveyor and said transfer for draping the leading end of the wrapper in said path of travel of said article, a conveyor for moving an article from said infeed conveyor against said draped end of said wrapper and onto said transfer, an article supporting plate, arms mounting said plate for movement into and out of an operative position relative to said article transfer, a movable supporting device operative during the travel of an article from said infeed conveyor onto said transfer for moving said arms to position said plate in said operative position between said infeed conveyor and adjacent said transfer subsequent to the movement of said lap roller between said article transfer and said infeed conveyor, said plate being constructed and arranged to provide a table over which said article moves onto said transfer, a transverse wrapping material gripping member also carried by said supporting device, and cooperating means on said transfer coacting with said member when said supporting plate is located in said operative position for engaging the depending end of said wrapper and controlling its encirclement about said article.

2. In a wrapping machine, an article infeed conveyor, an article transfer, a support for a wrapper, means for holding a wrapper on said support with the leading end thereof draped across the path of travel of an article onto said transfer, a lap roller mounted for movement between said conveyor and said transfer for draping said leading end of said wrapper in the path of travel of said article, a conveyor for moving an article from said infeed conveyor against said wrapper and onto said transfer, a gap closer for closing a space between said infeed conveyor and transfer, a movable supporting device for said gap closer, means for moving said supporting device to locate said gap closer in the path of travel of an article thereover onto said transfer, and a wrapper guide roller carried by said supporting device for guiding the lower end portion of said wrapper as said article moves with said wrapper onto said transfer.

3. In a wrapping machine, an article infeed conveyor, an article lifter table movable between an article receiving and an article delivering station, said table when located at said receiving station being spaced from said infeed conveyor, a space closing member, movable supports for said closing member, means for moving said supports to position said member in the space between said table and infeed conveyor during the travel of an article from said infeed conveyor over said member and onto said lifter table, a wrapper guide roller carried by said lifter table, a coacting guide roller mounted on said supports adjacent said member, and means for moving said supports when said lifter table is in article receiving position to engage said guide roller on said supports with said wrapper guide roller on said lifter table, said rollers being operative to guide and control the disposition of a portion of said wrapper relative to an article as said article is delivered onto said lifter table.

4. In a wrapping machine of the type described, an article foldway comprising an elongated bottom folding and package supporting surface, spaced movably mounted supports adjacent opposite sides of said surface, end folders carried by said supports, spaced side supporting frames mounting said supports, endless driving members supported by said frames and paralleling said surface, spaced package receiving members located at opposite sides of said surface, means on said frames mounting said receiving members in positions substantially coplanar with the package end engaging face of said folders, transverse supporting bars carried by said endless members, a plurality of sets of laterally spaced adjustable package conveying flights mounted on said bars including laterally movable carriages for each of said sets of flights, means for driving said members to cause said sets of flights to travel each package engaged thereby through said foldway and between said receiving members, and adjusting means engaging said laterally movable carriages and said movably mounted supports for simultaneously adjusting all of said sets of flights laterally along said bars, and said supports to conform with the length of a package being moved by said flights through said foldway.

5. In a wrapping machine of the type having an article foldway with folders for completing the wrapping of a wrapper about an article; a conveyor for moving a succession of articles being wrapped through said foldway, spaced frames mounting said conveyor, said conveyor comprising a plurality of sets of spaced pusher flights, each of said flights including a pusher, an article presser plate for engaging the top of an article being pushed by said flights through said foldway, a latch for holding said plate in inoperative position, means for driving said conveyor to move a set of pusher flights into engagement with an article to be moved through said foldway, and an unlatching device including a latch trip for successively freeing the presser plate of each of said pusher flights for movement into hold-down position upon the top of said article advanced by said set of flights.

6. In a wrapping machine of the type having an article foldway with spaced end folders and a bottom folding and sealing supporting surface for completing the wrapping of a wrapper about an article; a conveyor for moving a succession of articles being wrapped through said foldway, said conveyor comprising a plurality of sets of spaced pusher flights, each of said flights including a pusher, an article presser plate for engaging the top of an article moved by said pusher through said foldway, a latch for holding said plate in inoperative position, means for driving said conveyor to move a set of pusher flights into engagement with an article to be moved through said foldway, an unlatching device, a cam for operating said unlatching device to release said plate, and resilient means for biasing said plate into engagement with the top of an article to hold said article being advanced by a set of flights firmly against said surface.

7. In a wrapping machine of the type having an article foldway with spaced end folders and a bottom folding and sealing supporting surface for completing the wrapping of a wrapper about an article, a conveyor for moving a succession of articles being wrapped through said foldway, said conveyor comprising a plurality of sets of spaced pusher flights, each of said flights including a pusher, an article presser plate for engaging the top of an article moved by said pusher through said foldway, a latch for holding said plate in inoperative position, means for driving said conveyor to move a set of pusher flights into engagement with an article to be moved through said foldway, an unlatching device, a cam for operating said unlatching device to release said plate, resilient means for biasing said plate into engagement with the top of an article to hold said article being advanced by a set of flights firmly against said surface, spaced package receiving members located at the end of said foldway, and constructed and arranged to receive packages delivered by each set of flights from said foldway, and means operative when each package is located between said receiving members for latching the presser plates of each of said flights in said inoperative position.

8. A conveyor pusher unit for a wrapping machine comprising a transverse rod, a pair of movable supports mounted on said rod, a pusher flight carried by each of said supports, a guide carriage carried by each of said supports, laterally shaped elongated substantially parallel longitudinal bars tracked by each of said carriages, and means for laterally shifting the positions of said longitudinal rods and simultaneously changing the lateral spacing of said pusher flights.

9. A conveyor pusher unit for a wrapping machine comprising a transverse rod, a pair of movable supports mounted on said rod, a pusher flight carried by each of said supports, a guide carriage carried by each of said supports, laterally shaped elongated substantially parallel longitudinal bars tracked by each of said carriages, a presser plate carried by each of said flights, a latch, a lock coacting with said latch to hold each of said plates in inoperative position relative to each of said flights, means for tripping both of said latches to release said plates for movement into engagement with top portions of a package advanced by said set of flights, and means for returning said presser plates to latched inactive positions.

10. A conveyor pusher unit for a wrapping machine comprising a transverse rod, a pair of movable supports mounted on said rod, a pusher flight carried by each of said supports, a guide carriage carried by each of said supports, laterally shaped elongated substantially parallel longitudinal bars tracked by each of said carriages, a presser plate carried by each of said flights, means for latching each of said plates in inactive positions, cams carried by said longitudinal bars for tripping said latching means to release said plates, springs for biasing said plates into yielding relationship with the top of a package being conveyed by said set of flights, and means for laterally shifting the positions of said longitudinal rods and simultaneously changing the lateral spacing of said pusher flights.

11. In a wrapping machine of the type described, having an article foldway comprising a bottom folding and supporting surface, spaced supports mounted at opposite sides of said foldway, end folders carried by said supports; spaced side supporting frames for said supports located at opposite sides of said foldway, endless driving members supported by said frames, transverse adjusting members carried by said frames, transverse supporting bars carried by said endless members, adjustable sets of pusher flights carried by said bars, each of said flights including an article hold down presser member, means for maintaining said presser members in engagement with the top portions of articles being moved by said flights, spaced adjustable longitudinal guide bars engaging and maintaining said flights in adjusted operative positions relative to said folders, and means for rotating said transverse adjusting members to adjust said guide bars and effect a predetermined lateral spacing of said pusher flights.

12. A conveyor pusher comprising a support, a pusher flight mounted on said support, means for maintaining said flight in substantially a vertical operating plane, an article presser plate for engaging the top of an article advanced by said flight, means pivotally mounting said presser plate on said flight, a latch for holding said presser plate latched in inactive position relative to said pusher flight, trip means operative subsequently to the engagement of said flight with said article for releasing said latch, and a spring for biasing said unlatched presser plate downwardly into active article engaging position against the top of said article.

JAMES J. McGINLEY.

References Cited in the file of this patent

UNITED STATES PATENTS

| Number | Name | Date |
|---|---|---|
| 745,810 | Felmlee | Dec. 1, 1903 |
| 1,336,838 | Heeter | Apr. 13, 1920 |
| 1,468,626 | Brownell | Sept. 25, 1923 |
| 1,520,000 | Baker | Dec. 23, 1924 |
| 1,646,496 | Sandberg | Oct. 25, 1927 |
| 1,655,633 | Gordon | Jan. 10, 1928 |
| 1,723,967 | Brownell | Aug. 6, 1929 |
| 1,734,362 | Brownell | Nov. 5, 1929 |
| 1,915,550 | Schmitt | June 27, 1933 |
| 1,953,195 | Smith | Apr. 3, 1934 |
| 1,964,070 | Mertis | June 26, 1934 |
| 2,034,048 | Jensen | Dec. 1, 1942 |
| 2,052,717 | Littlefield | Sept. 1, 1936 |
| 2,071,548 | Lyon | Feb. 23, 1937 |
| 2,088,157 | Petskeys | July 27, 1937 |
| 2,105,159 | Petskeys | Jan. 11, 1938 |
| 2,114,833 | Fincke | Apr. 19, 1938 |
| 2,144,265 | Milmore | Jan. 17, 1939 |
| 2,144,448 | Brightwell | Jan. 17, 1939 |
| 2,220,367 | Gellman | Nov. 5, 1940 |
| 2,235,503 | Petskeys | Mar. 18, 1941 |
| 2,260,324 | Kottmann | Oct. 28, 1941 |
| 2,260,332 | Petskeys | Oct. 28, 1941 |
| 2,273,961 | Hoppe | Feb. 24, 1942 |
| 2,330,715 | Hoppe | Sept. 28, 1943 |
| 2,366,888 | Werden | Jan. 9, 1945 |
| 2,374,148 | Whipple | Apr. 17, 1945 |
| 2,385,706 | Jensen | Sept. 25, 1945 |
| 2,434,616 | Hoppe | Jan. 13, 1948 |
| 2,486,892 | Sumida | Nov. 1, 1949 |
| 2,538,564 | Jensen | Jan. 16, 1951 |